United States Patent
Farrokhroo

(10) Patent No.: US 12,400,249 B1
(45) Date of Patent: *Aug. 26, 2025

(54) SORTING PROCESS TO MAKE NEGOTIATED RATES AVAILABLE FOR PRESCRIPTION DRUGS

(71) Applicant: Alireza Farrokhroo, El Segundo, CA (US)

(72) Inventor: Alireza Farrokhroo, El Segundo, CA (US)

(73) Assignee: ALFA Rx LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,072

(22) Filed: Apr. 5, 2024

Related U.S. Application Data

(63) Continuation of application No. 18/223,468, filed on Jul. 18, 2023, now Pat. No. 11,978,100.

(60) Provisional application No. 63/393,827, filed on Jul. 30, 2022.

(51) Int. Cl.
| | |
|---|---|
| *G06Q 30/00* | (2023.01) |
| *G06Q 30/0207* | (2023.01) |
| *G06Q 30/0601* | (2023.01) |
| *G06Q 40/08* | (2012.01) |

(52) U.S. Cl.
CPC ..... *G06Q 30/0617* (2013.01); *G06Q 30/0207* (2013.01); *G06Q 40/08* (2013.01)

(58) Field of Classification Search
CPC . G06Q 30/0617; G06Q 30/0207; G06Q 40/08
USPC .................................................. 705/26, 27
See application file for complete search history.

(56) References Cited

U.S. PATENT DOCUMENTS

| | | | |
|---|---|---|---|
| 7,734,483 B1 * | 6/2010 | Smith .................. | G16H 70/40 705/3 |
| 8,781,857 B2 | 7/2014 | Kalies, Jr. | |
| 2012/0158429 A1 * | 6/2012 | Murawski ............. | G16H 10/60 705/2 |
| 2012/0226573 A1 | 9/2012 | Zakas et al. | |

(Continued)

OTHER PUBLICATIONS

Aliamo, Carol Ann, "Caution is advised on prescription discount plans," Arizona Daily Star, Tucson, Arizona, Nov. 24, 2018, 2 pages.

(Continued)

*Primary Examiner* — Robert M Pond
(74) *Attorney, Agent, or Firm* — Plager Schack LLP; Mark H. Plager; Alexis Saenz

(57) ABSTRACT

An online platform and methods sort prescription drug claims for alternate fulfillment and/or discounted pricing. An electronic request for a prescription is forwarded to third-party prescription providers. In reply, proposed prices are received for the prescription. A computer processor forwards the received proposed prices for the prescription to an artificial intelligence engine. The artificial intelligence engine determines a selected one of the third-party prescription providers, based on the proposed prices. In addition, the determined selected third-party prescription provider and the proposed price are routed to the end electronic terminal in for example, a pharmacy. Embodiments include finding an alternate provider in the event of a rejected prescription claim.

20 Claims, 11 Drawing Sheets

(56) References Cited

U.S. PATENT DOCUMENTS

| | | | |
|---|---|---|---|
| 2012/0253846 A1* | 10/2012 | John | G16H 40/67 |
| | | | 705/2 |
| 2013/0144649 A1 | 6/2013 | Kalies, Jr. | |
| 2015/0142479 A1* | 5/2015 | Porter | G06Q 40/08 |
| | | | 705/4 |
| 2015/0339764 A1 | 11/2015 | Roychowdhury | |
| 2019/0385722 A1 | 12/2019 | Wiley, II | |
| 2020/0105392 A1* | 4/2020 | Karkazis | G16H 50/30 |
| 2021/0050081 A1* | 2/2021 | Malkin | G06Q 30/0641 |
| 2021/0065862 A1* | 3/2021 | Siegel | G16H 40/63 |
| 2022/0012766 A1* | 1/2022 | Hinton, II | G06Q 30/0239 |
| 2022/0277376 A1* | 9/2022 | Saxena | G06Q 20/085 |

OTHER PUBLICATIONS

Guckeen, Amy, "Web company gives prescription for competition: Site allows consumers to shop around for best deals on medications", McClatchy—Tribune Business News, Washington, May 23, 2007, 3 pages.

* cited by examiner

SORTING PROCESS TO MAKE NEGOTIATED RATES AVAILABLE FOR PRESCRIPTION DRUGS

RELATED APPLICATION

This application claims priority to U.S. Non-Provisional application Ser. No. 18/223,468, filed on Jul. 18, 2023, which claimed priority to provisional patent application U.S. Ser. No. 63/393,827 filed on Jul. 30, 2022, the entire contents of which are herein incorporated by reference in their entirety.

BACKGROUND

The embodiments herein relate generally to communication systems for pharmacy benefit claims and drug prices.

Pharmaceutical pricing and determining member cost and coverage for a drug is a complex and inefficient process. In general, insurance companies, pharmacy benefit managers or drug discount cards negotiate drug prices with pharmacies and drug manufacturers. These entities sometime adjudicate a claim for coverage "paid claim" and generate a copay and sometimes reject a drug "rejected claim" for coverage at point of sales.

A "rejected claim" occurs at a pharmacy where an insurer does not cover the drug at the point of sale. At this point, many members either abandon the drugs their doctor has prescribed for them due to cost, or pay the undiscounted full price for a drug charged by the pharmacy. Alternatively, if member happens to be familiar with a drug discount network, member can search for and find a drug discount network on their own that may have a better price and subsequently ask the pharmacy to process the drug discount. There are hundreds of drug discount networks available out there and it is nearly impossible for an individual member to price shop to find the best price among all of them.

A "paid claim" occurs at a pharmacy where an insurer adjudicates the drug claim and generates a copay that member should pay to the pharmacy for that drug at the point of sale. Many times, there are drug discount networks available that have a better copay available. Most times members are not aware of these drug discount networks or may need to do extensive search to find and manually bring it to the pharmacy and ask pharmacy to process to be able to access the better price. There are hundreds of drug discount networks available out there and it is nearly impossible for an individual member to price shop to find the best price among all of them. This process demonstrates poor claim sorting.

SUMMARY

In one embodiment, an automated method of generating optimized prescription pricing acquisition is disclosed. The method includes receiving by a computer processor, an electronic request through a network connection from an end electronic terminal, wherein the electronic request includes a claim for a prescription. The electronic request is forwarded to a plurality of third-party prescription providers. In reply to the forwarded electronic request, proposed prices are received for the prescription, from respective third-party prescription providers. The computer processor forwards the received proposed prices for the prescription to an artificial intelligence engine. The artificial intelligence engine determines a selected one of the third-party prescription providers, based on the proposed prices. In addition, the determined selected third-party prescription provider and the proposed price are routed from the selected third-party prescription provider, to the end electronic terminal.

In another embodiment, a computer program product for generating optimized prescription pricing acquisition is disclosed. The computer program product includes one or more computer readable storage media, and program instructions collectively stored on the one or more computer readable storage media. The program instructions include receiving by a computer processor, an electronic request through a network connection from an end electronic terminal, wherein the electronic request includes a claim for a prescription. The electronic request is forwarded to a plurality of third-party prescription providers. In reply to the forwarded electronic request, proposed prices are received for the prescription, from respective third-party prescription providers. The computer processor forwards the received proposed prices for the prescription to an artificial intelligence engine. The artificial intelligence engine determines a selected one of the third-party prescription providers, based on the proposed prices. In addition, the determined selected third-party prescription provider and the proposed price are routed from the selected third-party prescription provider, to the end electronic terminal.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Definitions

Figure 1:
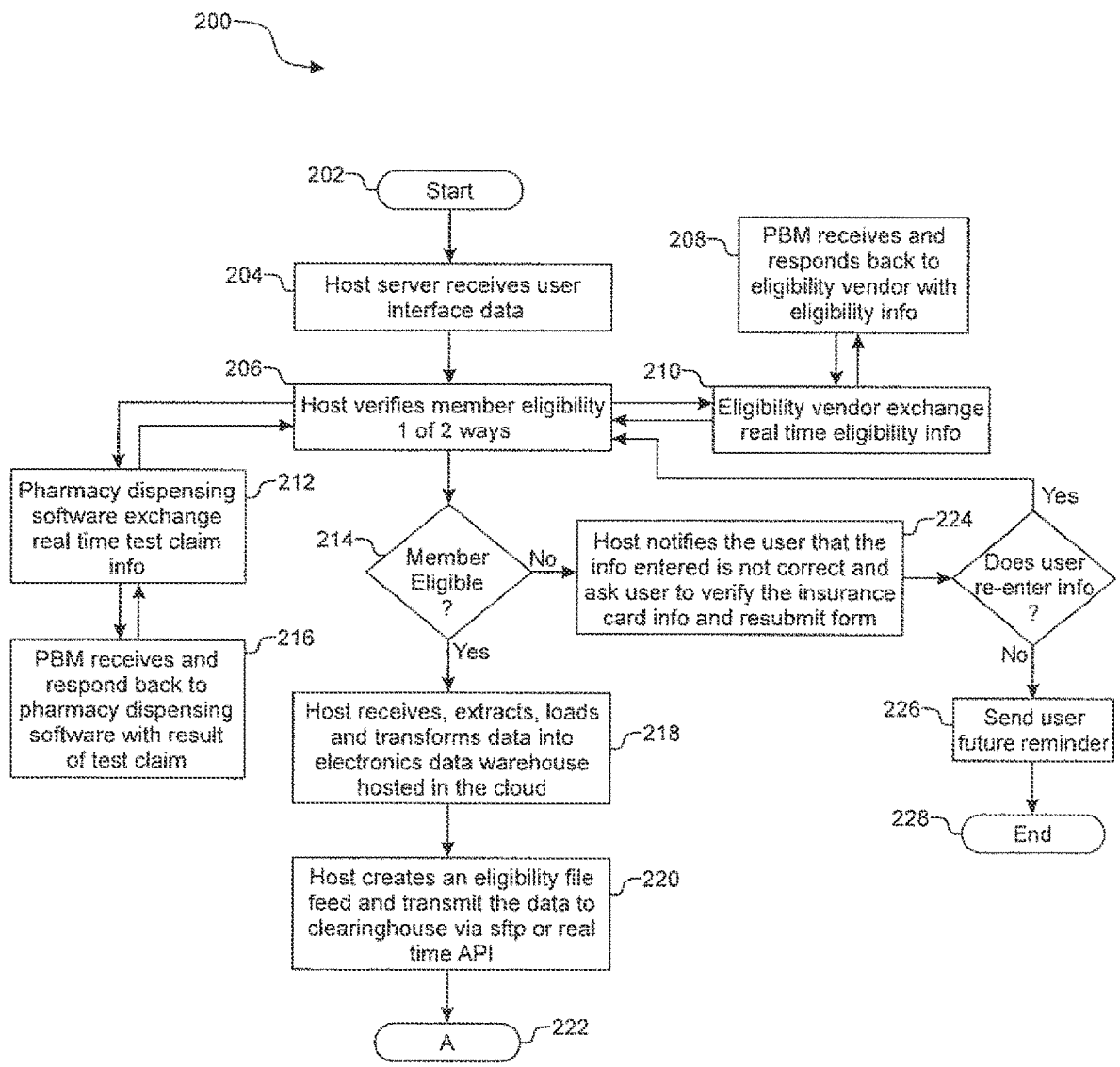
FIG. 1 is a flowchart of a process for determining individual member eligibility and enrolling members into a prescription discount online platform according to an embodiment.

Pharmacy Benefit Manager (PBM), as used herein, refers to a third-party administrator of prescription drug programs.

Clearinghouse, as used herein, refers to an institution that electronically transmits pharmaceutical/prescription claims data to insurance carriers. The clearinghouse securely transmits the electronic claim data to a specified payor over a secure connection.

ID, as used, herein refers to a member identification number provided by the insurer to the member.

BIN, as used, herein refers to Bank Identification Number which is a six-digit code provided by the insurer to the member to process electronic claims.

PCN, as used, herein refers to a Processor Control Number and is a secondary identifier that may be used in routing of pharmacy transactions provided by the insurer to the member.

GROUP, as used, herein refers to the group number assigned by a health insurance company to identify a member's group health plan.

Artificial Intelligence (A.I.), as used herein, refers to computer software that mimics human cognitive abilities in order to perform complex tasks. A.I. engines learn from their interactions to improve their performance and efficiency.

Machine Learning (M.L.), as used herein, refers to a subset of A.I. in which algorithms are trained on data sets to become machine learning models capable of performing specific tasks.

Engine, as used, herein refers to software and/or hardware module that executes the foundation or crucial task for other programs.

Retrospective, as used herein refers to evaluating by the subject technology, whether a better price for a claim than a price provided by a third-party entity can be found in the system after price has been displayed to a pharmacy's system.

Adjudicate, as used herein refers to a process of paying or denying a claim submitted after comparing the claim to a member's benefit and/or coverage requirements.

Overview

The present disclosure generally relates to systems and methods for automated processing of a prescription claim that determine optimized pricing for an end consumer based on the various factors associated with the end consumer's claim. Typically, in a pharmacy environment, a staff member or pharmacist manually hunts down a drug's availability from a limited number of sources. Generally speaking, the price for a prescription claim can vary widely depending on the pharmacy through which the claim is made. In addition, many networks are limited in their access to prescription drug pricing, the common result of which is that a particular drug may be rejected in a claim if the drug is not covered within the pharmacy's network of providers. Current systems do not have the technology to provide alternatives to locating a viable source for a drug that was part of a rejected claim.

In the present disclosure, systems are automated to seek a prescription from a plurality of third-party providers and determine which provider's offering is optimized according to factors associated with the end consumer's medical plan.

An A.I. engine may make electronic decisions that are improved over conventional systems, which are based on historical experience with the third-party providers. Factors to be considered by the A.I. may include pricing, end consumer co-pay coverage, dosage availability, brand name versus generic form availability, time of delivery, refill availability, and trustworthiness of the source. In some embodiments, the above criteria (and additional factors) may be input into a user interface at the end terminal requesting the prescription (for example, a pharmacy networked terminal or end user's computing device). The criteria for each prescription order may be customized; for example, based on factors associated with the end consumer and his or her plan or account. Accordingly, it can be appreciated that the A.I. engine of the present disclosure considers many variables in making the automated decision. It should be appreciated that aspects of the teachings herein are beyond the capability of a human mind because the number of permutations involved with making a decision are extensive. The time to compare each permutation is beyond practical given that the end consumer in a pharmacy is generally unable to wait hours or days for a single staff member to check each permutation. Moreover, the time required makes other consumers waiting in line unable to fill their own prescriptions with optimization and thus, they would remain waiting while ill. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Figure 11:
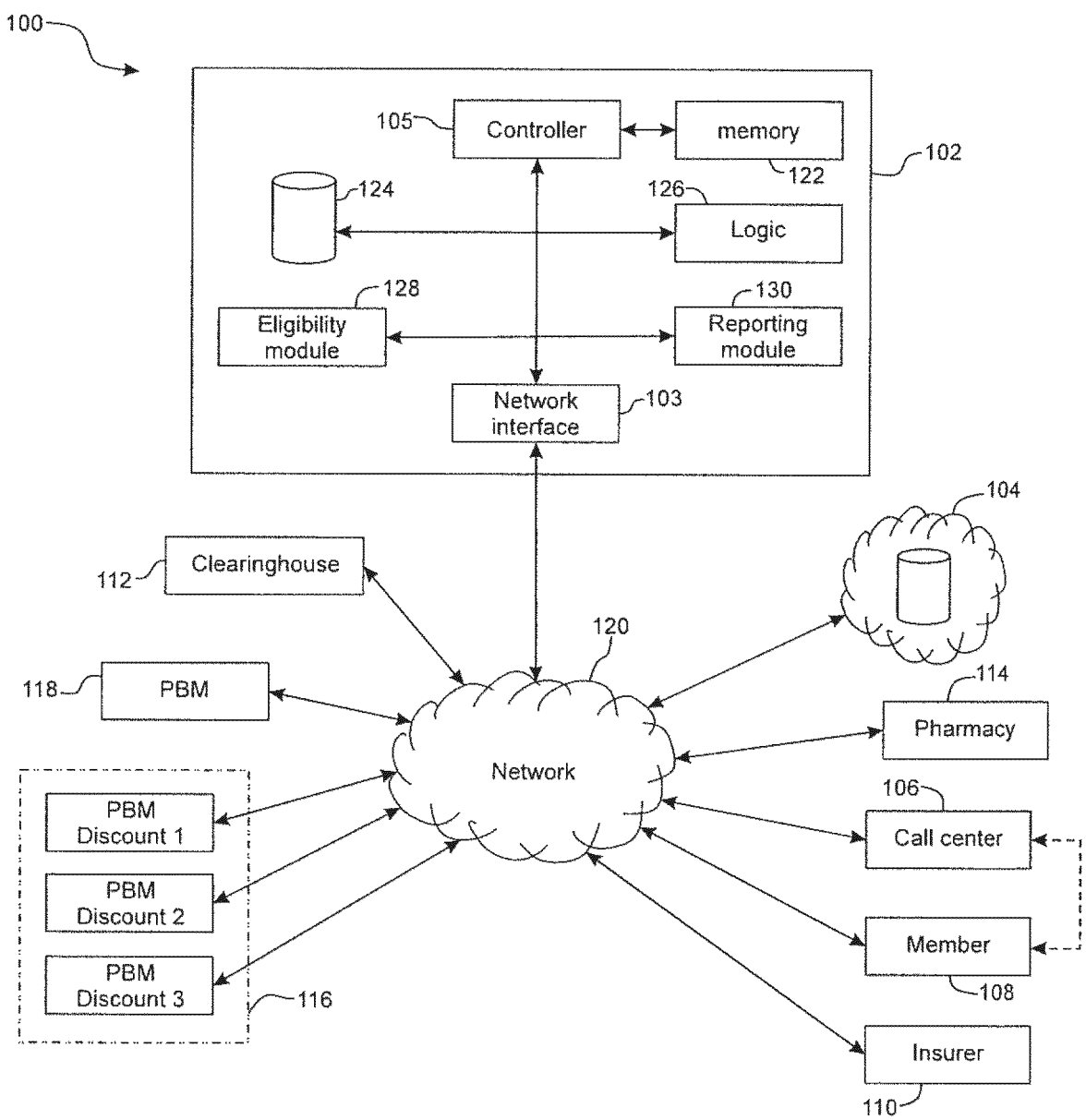
FIG. 11 is a block diagram of a system for providing prescription discount optimization through an electronic network according to an embodiment.

Referring temporarily to FIG. 11, a system 100 (referred to generally below as the "system 100" or just the "system") for automating prescription claim fulfillment is shown according to an embodiment. The system 100 generally includes a computing device 102 connected through a network 120 to a database 104 and a plurality of third-party entities. The third-party entities may include for example, an insurer 110, a clearinghouse 112, discount network processors 116, and one or more PBMs 118. Information on members, current drugs, prescriptions, member plans, co-pays, and pricing may be accessed from the database 104.

In embodiments below, the system may be accessed by and may communicate with one or more pharmacies 114 that submit prescription claims. In some embodiments, the pharmacies 114 may have a software embodiment loaded onto their computing devices 102 that automatically checks for the availability of discounted pricing or alternative providers of a prescription. The discount pricing and/or alternate availability may sometimes be based on a prescription claim being rejected by one of the third-party entities. In some embodiments, the system 100 may automatically check for discounts/availability for all members when one pharmacy 114 makes a prescription claim request.

The computing device 102 may be a dedicated terminal used in a pharmacy setting or may be a general computing device programmed with software that runs an application (including an application programming interface (API) and a user interface (UI) with elements configured to provide aspects of the subject technology. It will be understood that a "computing device" may serve different roles depending on the need in the system or depending on the step being performed in a process. For example, in the role of a web server, a host server, or an online platform server of the subject system providing the optimization of prescription fulfillment as a service, the computing device 102 may implement for example the functions related to backend processes (for example, those described below with respect to FIGS. 1-10). In the aforementioned roles, the computing device may also coordinate client accounts and provide the output generated by the backend for display on frontend interfaces of client computing devices (for example, pharmacy terminals or personal end user computing devices). In another role, the computing device 102 may be a repository of data connected via the network 120, from which the backend processing computing device(s) retrieve their data related to the end consumer, data related to drug providers, data related to discounts, data related to generic alternatives, and data related to plan coverage for the end consumer. In the role of a user device, the computing device 102 is generally not a server but may instead be desktop computers, tablet or laptop computers, all-in-one computer stations, a mobile computing device (for example, a smart phone, smart wearable devices (glasses, jewelry, watches, car wear, etc.), or programmable electronics. As will be understood, the user device may generally provide frontend aspects of the system including an API and/or a UI. In some embodiments however, the frontend computing device may perform one or more of the backend steps where possible.

The components of the computing device 102 may include, but are not limited to, one or more computer processors or controller units 105, a system memory 122, data storage 124, a computer program product or logic 126 having a set of program modules including files and executable instructions. Embodiments may include an A.I. engine in the logic module 126. Some embodiments may include dedicated modules, for example, an eligibility module that includes program modules to determine the eligibility of a consumer user for services in the online platform and a reporting module 130 that is configured to provide results of the prescription optimization fulfillment for output in a UI. A bus system couples various system components including the system memory 122 to the processor(s) 105.

The program modules generally carry out the functions and/or methodologies of embodiments as described below. The computing device 102 may typically include a variety of computer system readable media. Such media could be chosen from any available media that is accessible including non-transitory, volatile and non-volatile media, removable and non-removable media for use by or in connection with an instruction execution system, apparatus, or device. The system memory 122 could include one or more computer system readable media in the form of volatile memory, such as a random-access memory (RAM) and/or a cache memory. By way of example only, the data storage system 124 may read from and write to a non-removable, non-volatile magnetic media device. Some embodiments may generate an electronic user interface that may allow the user to enter prescription claim information and customized criteria, and displays results of the processes disclosed herein.

The computing device 102 may communicate with one or more external devices through a network interface/port(s) 103. The interface/port(s) 103, may communicate with one or more networks 120 such as a local area network (LAN), a general wide area network (WAN), and/or a public network (e.g., the Internet) via a network adapter as is commonly known in the art. In some embodiments, the computing device 102 may be a cloud computing node connected to a cloud computing network. The computing device 102 may be practiced in distributed cloud computing environments where tasks are performed by remote processing devices that are linked through a communications network. In a distributed cloud computing environment, program modules may be located in both local and remote computer system storage media including memory storage devices. In some embodiments, the A.I. functions may be performed amongst multiple computing devices 102 in the cloud computing environment.

As will be appreciated by one skilled in the art, aspects of the disclosed technology may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." In addition, some embodiments below are described with reference to block diagrams of methods, apparatus (systems) and computer program products. It will be understood that each block of the block diagrams, and combinations of blocks in the flowchart illustrations and/or block diagrams, can be implemented by computer program instructions. These computer program instructions may be provided to the processor/controller 105, such that the instructions, which execute via the processor of the computer or other programmable data processing apparatus, create means for implementing the functions/acts specified in the flowchart and/or block diagram block or blocks in the figures.

FIG. 1 shows a method 200 for determining individual member eligibility and enrolling members into a prescription discount online platform according to an embodiment. From the platform's perspective, the method 200 generally starts 202 when a host server receives 204 input data from an end consumer (or a pharmacy staff member engaging an electronic pharmacy claim network) that wishes to be a member through a user interface (either party referred to individually as an "end user" in the disclosure that follows). The consumer user may enroll by visiting a website or the platform may reach out to insurers. Users may enter their medical/drug insurance information from their insurance and personal identification information. This information includes for example, ID, BIN, PCN, GROUP and other data associated with the consumer user. In block 206, the host server may choose one of multiple ways to verify that the prospective member is eligible to enroll in the platform's service. An individual user can either directly sign up for the service or their insurance company, PBM, Employer Group, Third Party Administrator, or similar entity that is a client of the platform can sign them up for the service. For example, the host server may send 210 a real time eligibility inquiry to an eligibility vendor. The information includes the ID, BIN, PCN, GROUP and other information collected. The eligibility vendor exchanges 208 real-time eligibility information between the host server and a third-party service provider, for example, a PBM. The PBM receives and responds back to eligibility vendor with eligibility information. Alternately, the host server may send 212 a prescription test claim using pharmacy dispensing software. A pharmacy dispensing software exchanges 216 real-time test claim information from the host server to the PBM. The PBM receives and responds back to pharmacy dispensing software with a result of test claim. The host server may determine 214 membership eligibility based on the results of the exchange with the vendor or the test claim. If the member is eligible, the host server may receive 218 extract, transform, and load (ETL) data processed from the input data of the user (block 204). The ETL data may be warehoused in a database hosted in the cloud. The host server creates 220 an eligibility file feed for the subject consumer user and transmits the data to a clearinghouse via sftp or real time API communication. In some embodiments, block 222 represents a starting point for other methods that may occur after successful enrollment.

If the event the prospective member is not eligible, the host server notifies 224 the user that the information entered is not correct and requests the user to verify the insurance information for re-submission. In some embodiments, the host server performs a determination of whether the end consumer user re-entered the insurance information. If so, the method may iterate back to block 210. Otherwise, the host server may send 226 the consumer user a future email reminder. The enrollment method may terminate at block 228.

Figure 2:
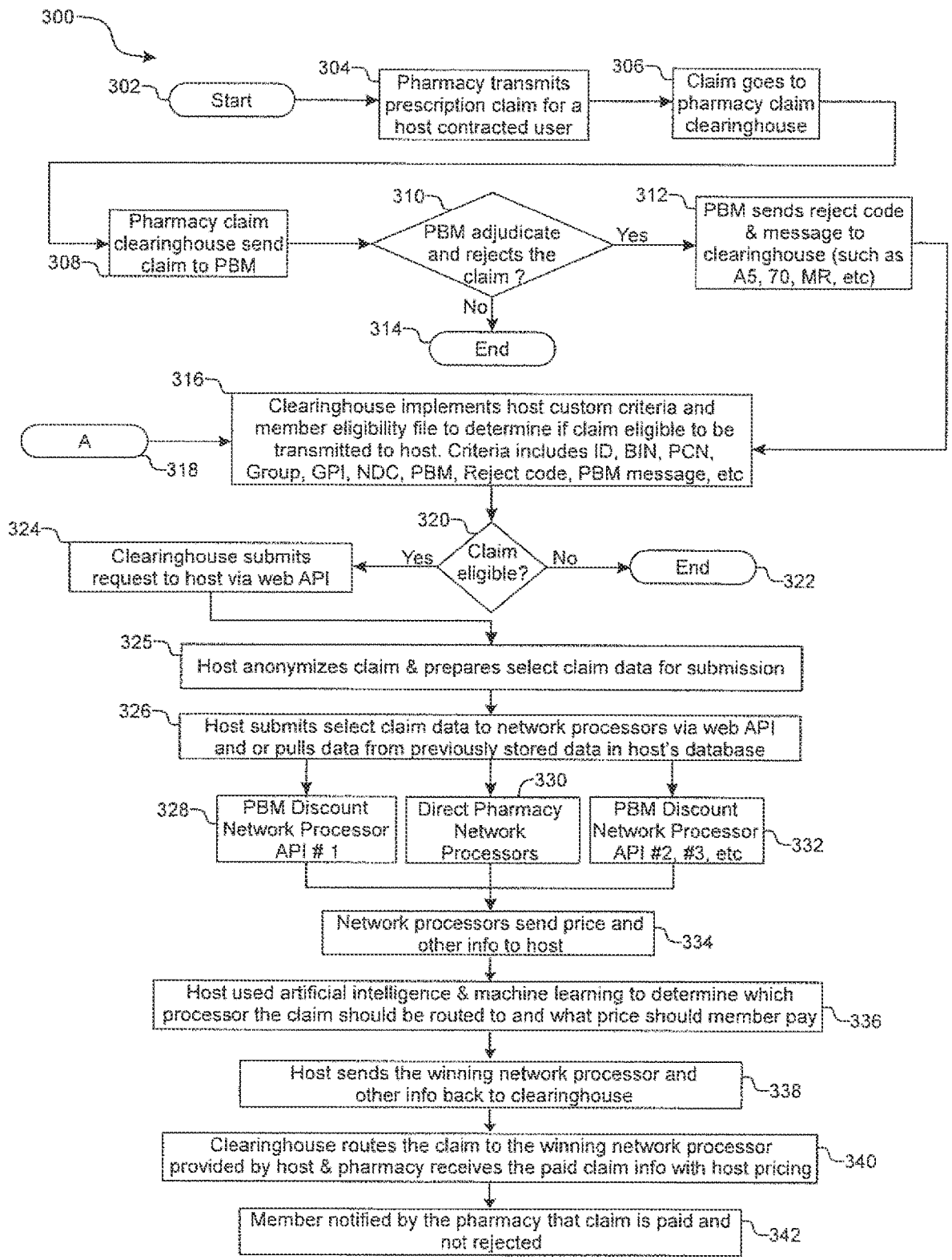
FIG. 2 is a flowchart of a process generating instant prescription discounts for rejected prescription claims using a clearinghouse process according to an embodiment.

FIG. 2 shows a method 300 for automated generation of instant prescription discounts for rejected prescription claims using a clearinghouse process according to an embodiment. After the initial start block 302, the clearinghouse receives 304 a prescription claim for a user/member. The claim may be sent 306 by the pharmacy to a pharmacy claim clearinghouse. The pharmacy claim clearinghouse sends 308 the claim to the PBM. The PBM adjudicates 310 the claim. In the event the PBM accepts the claim, the process ends at block 314. In the event the PBM rejects the claim, the PBM sends 312 a rejection code and message to the clearinghouse. The message may include for example, A5, 70, MR, etc. The clearinghouse may implement 316 custom criteria and the member eligibility file to determine if the claim eligible to be transmitted to the host server for processing under the instant method. Example criteria may include ID, BIN, PCN, Group, GPI, NDC, PBM, Reject code, PBM Message and others. The host server may determine 320 whether the claim is eligible for instant discount pricing. If not, the process ends at block 322. If so, then the clearinghouse submits 324 a request to the host server (for example, via a web API). In some embodiments, the host server may anonymize 325 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third-party processors to determine an optimal price for the claim. As may be appreciated, anonymizing the claim may provide improved identity theft security and/or secures privacy concerns for the end user claimant. In addition, anonymizing the claim may remove any biases on name, race, gender, etc. that may be built into the pricing system within the insurance industry. Then, the host server submits 326 prescription claim information to a plurality of discount network processor entities (328, 330, and 332), which may be PBM or direct pharmacy network discount processors. In some embodiments, including additional embodiments described with respect to figures, after FIG. 2, the process may use either the anonymized or unadulterated form of the prescription claim information. The discount network processors send 334 price and other information back to the host server. In some embodiments, the host server uses an A.I. engine, to select a best network processor to fulfill the prescription at a discount. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages among many other data sets. Examples of criteria and algorithms considered by the A.I. engine include using these large sets to choose the lowest drug cost possible for the member while maintaining drug price at specific level to meet required pharmacy network generic effective rate and brand effective rate guarantees. The algorithms are used to optimize pricing. The host server sends 338 the winning network processor and other information about the proposed prescription fulfillment back to the clearinghouse. The clearinghouse routes 340 the claim to the winning network processor. The clearinghouse receives a paid claim from the winning network processor and sends the updated paid claim to the pharmacy. The pharmacy receives the paid claim information including the host server acquired discount pricing. In one embodiment, receipt of the instant discounted claim is displayed on an end terminal at the pharmacy. The member may be notified 342 by the pharmacy that claim is paid.

Figure 3:
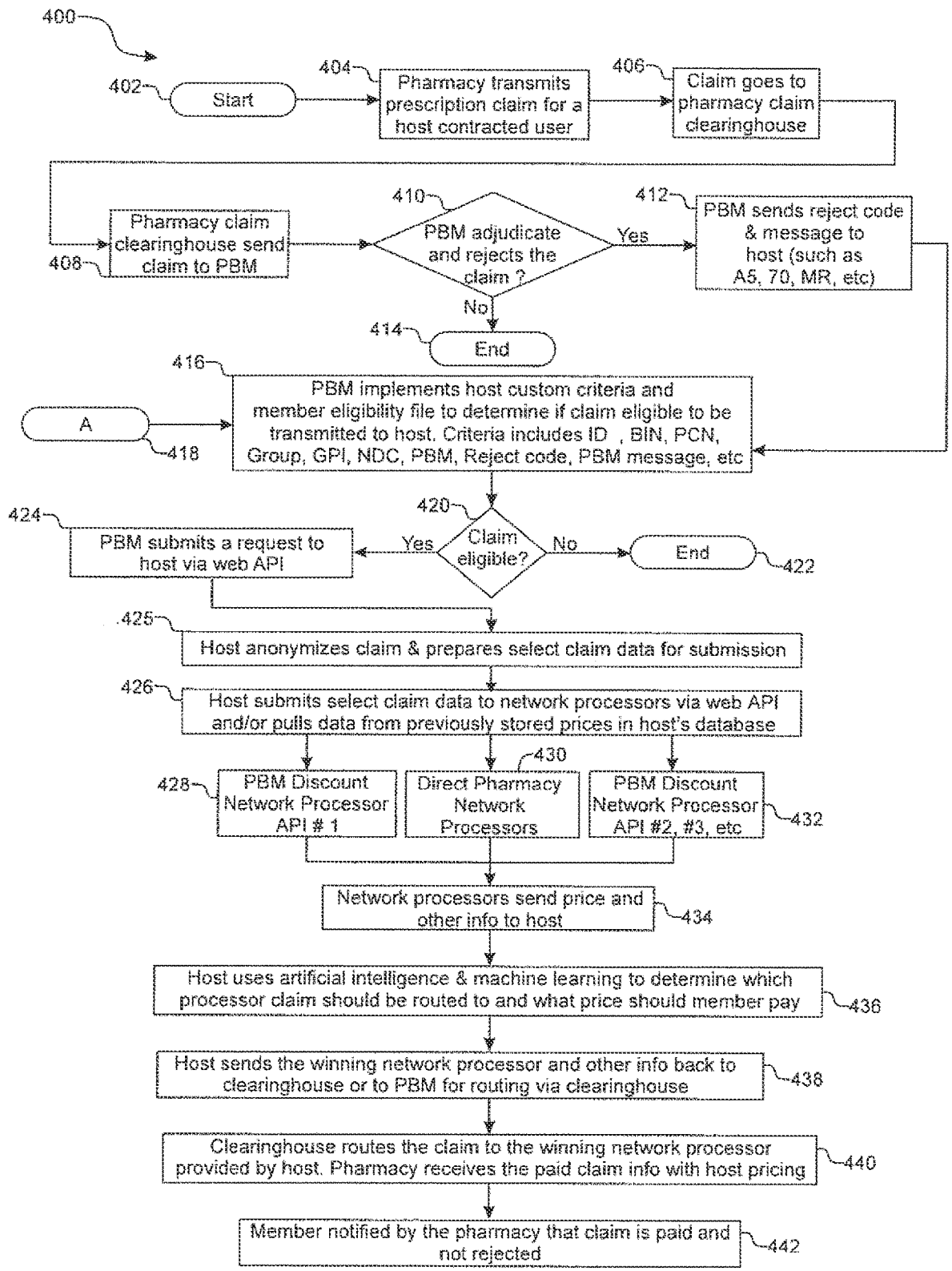
FIG. 3 is a flowchart of a process for generating instant prescription discounts for rejected prescription claims using a PBM according to an embodiment.

FIG. 3 shows a method 400 for automated generation of instant prescription discounts for rejected prescription claims using a PBM process according to an embodiment. In the method 400, blocks 402-412 are similar to the blocks 302-312 of method 300 and are not repeated for sake of eliminating unnecessary repetition. In method 400, the PBM may implement 416 custom criteria and the member eligibility file to determine if the claim eligible to be transmitted to the host server for processing under the instant method. Example criteria may include ID, BIN, PCN, Group, GPI, NDC, PBM, Reject code, PBM Message and others. The host server may determine 420 whether the claim is eligible for instant discount pricing. If not, the process ends at block 422. If so, then the PBM submits 424 a pricing request to the host server (for example, via a web API). In some embodiments, the host server may anonymize 425 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim. Then, the host server submits 426 prescription claim information to a plurality of discount network processor entities (428, 430, and 432). The discount network processors send 434 price and other information back to the host server. In some embodiments, the host server uses an A.I. engine, to select a best discount network processor to fulfill the prescription at a discount. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithms considered by the A.I. engine include using these large sets to choose the lowest drug cost possible for the member while maintaining drug price at specific level to meet required pharmacy network generic effective rate and brand effective rate guarantees. The algorithms are used to optimize pricing. The host server sends 438 the winning discount network processor and other information about the proposed prescription fulfillment back to the clearinghouse or to the PBM. The clearinghouse routes 440 the claim to the winning discount network processor. The clearinghouse receives a paid claim from the winning discount network processor and sends the updated paid claim to the pharmacy. The pharmacy receives the paid claim information including the host server acquired discount pricing. In one embodiment, receipt of the instant discounted claim is displayed on an end terminal at the pharmacy. The member may be notified 442 by the pharmacy that claim is paid.

Figure 4:
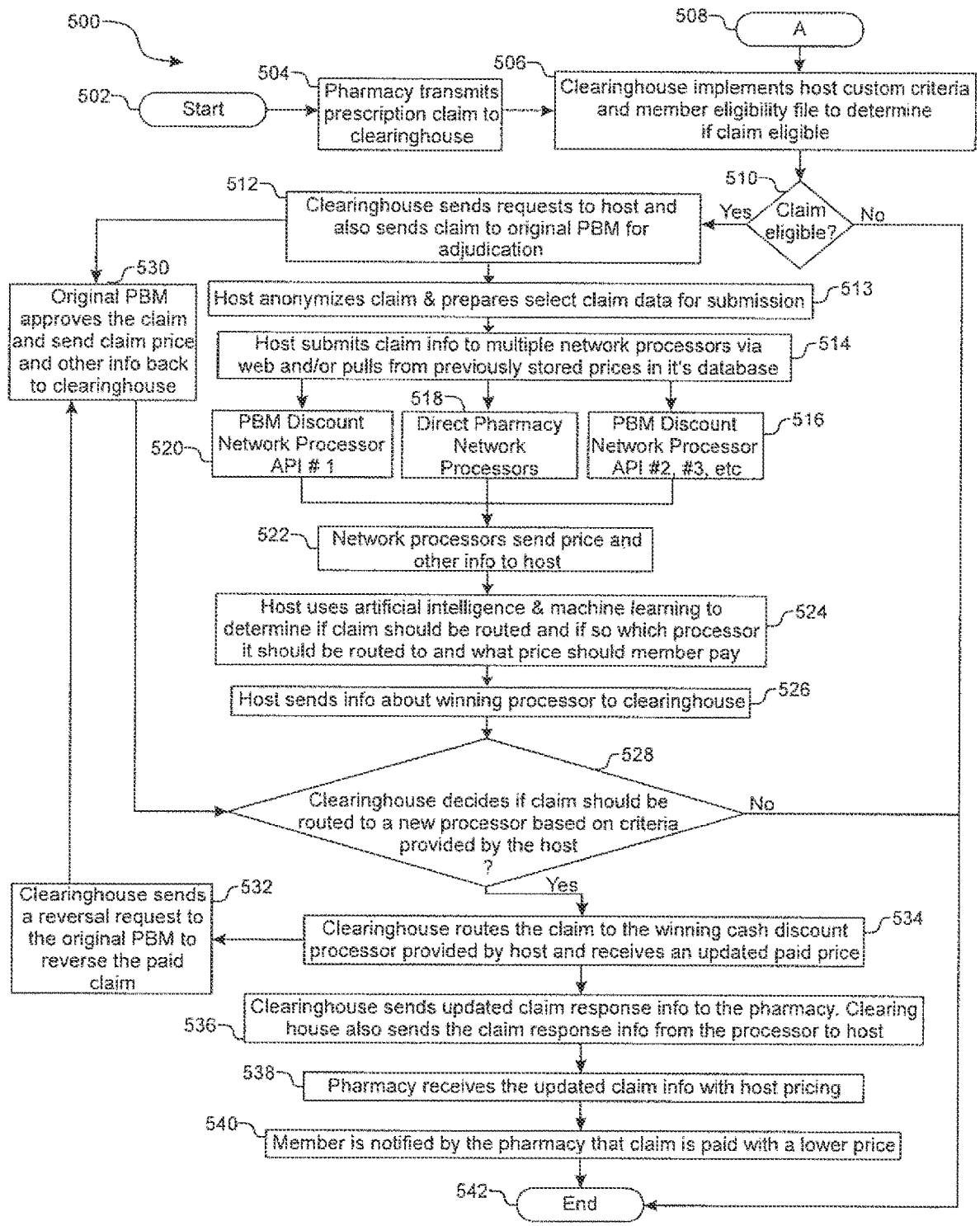
FIG. 4 is a flowchart of instantly generating a better drug price for a member than their PBM using a clearinghouse process to compare pricing parallel according to an embodiment.

FIG. 4 shows a method 500 of instantly generating a better drug price for a member than their PBM using a clearinghouse process to compare pricing parallel according to an embodiment. After the initial start block 502, the clearinghouse receives 504 a prescription claim for a user/member. The claim may be sent by the pharmacy to a pharmacy claim clearinghouse. The clearinghouse may implement 506 custom criteria and the member eligibility file to determine 510 if the claim is eligible to be transmitted to the host server for processing under the instant method. Example criteria may include ID, BIN, PCN, Group, GPI, NDC, PBM, Reject code, PBM Message and others. The clearinghouse may determine 510 whether the claim is eligible for instant discount pricing. If not, the process ends at block 542. If so, then the clearinghouse submits 512 a request to the host server (for example, via a web API). The clearinghouse also sends the claim to the original PBM for adjudication.

In some embodiments, the original PBM may approve the claim. The original PBM may send 530 the claim price and the information associated with the claim back to the clearinghouse. The method 500 may re-join the flow at block 528 described below.

In some embodiments, the host server may anonymize 513 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim. The host server submits 514 the prescription claim information to a plurality of discount network processor entities (516, 518, and 520). The discount network processors send 522 price and other information back to the host server. In some embodiments, the host server uses an A.I. engine, to determine 524 if the claim should be sent to a network processor and if so what price the consumer user should pay. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithm considered by the A.I. engine include using these large sets to choose the lowest drug cost possible for the member while maintaining drug price at specific level to meet required pharmacy network generic effective rate and brand effective rate guarantees. The algorithms are used to optimize pricing. The host server sends 526 the identity of the winning discount network processor and other information about the proposed prescription fulfillment back to the clearinghouse. In some embodiments, the clearinghouse determines 528 whether the claim should be routed to the winning network processors provided by the host based on criteria provided by the host server. Example of criteria is if the drug price generated by the host is better than the price generated by the original PBM The clearinghouse routes 534 the claim to the winning cash discount network. In some embodiments, the clearinghouse sends 532 a reversal request to the original PBM to reverse the paid claim. The clearinghouse sends 536 updated claim response information to the pharmacy originating the claim request. The clearinghouse may also send the claim response information from the discount processor to the host server. The pharmacy receives 538 the updated claim information including the host server acquired discount pricing. In one embodiment, receipt of the instant discounted claim is displayed on an end terminal at the pharmacy. The member may be notified 540 by the pharmacy that claim is paid with a lower price that was adjudicated by the PBM block 530.

Figure 5:
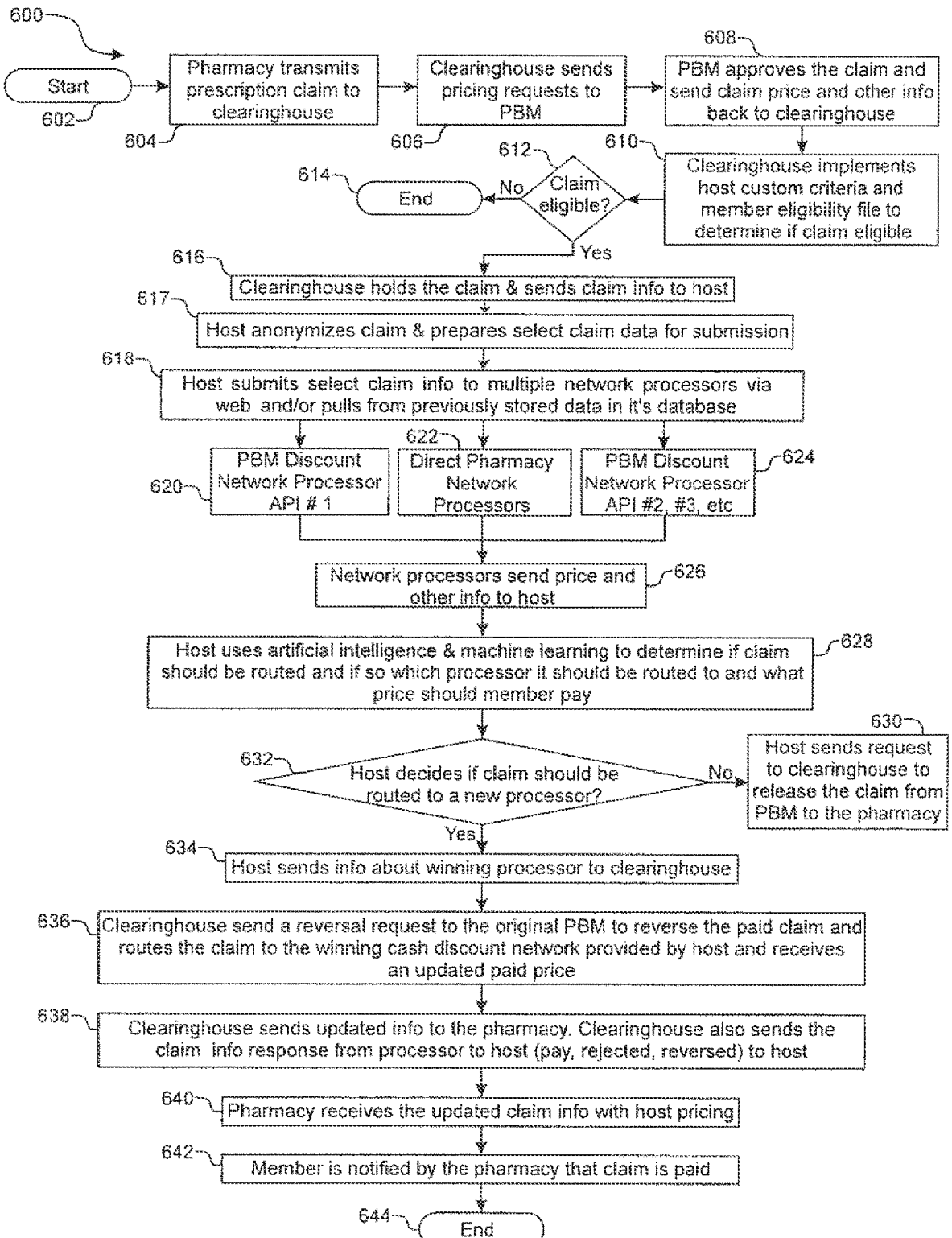
FIG. 5 is a flowchart of instantly generating a better drug price for a member than their PBM using a clearinghouse process to compare pricing post PBM adjudication according to an embodiment.

FIG. 5 shows a method 600 of instantly generating a better drug price for a member than their PBM using a clearinghouse process to compare pricing post PBM adjudication according to an embodiment. After the initial start block 602, the clearinghouse receives 604 a prescription claim for a user/member. In some embodiments, the claim may have been initially rejected by a third-party entity (for example, an insurer, a drug provider, etc.). The claim may be forwarded to a clearinghouse. The clearinghouse sends 606 a request for pricing of the claim to one or more PBMs. A PBM approves 608 the claim. The claim price and other information associated with the claim is sent back to the clearinghouse. The clearinghouse may implement 610 custom criteria and the member eligibility file to determine if the claim eligible to be transmitted to the host server for processing under the instant method. Example criteria may include ID, BIN, PCN, Group, GPI, NDC, PBM, Reject code, PBM Message and others. The host server may determine 612 whether the claim is eligible for instant discount pricing. If not, the method 600 may end at block 614. In some embodiments, the host server may anonymize 617 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim.

For eligible claims, the clearinghouse may hold the claim and send 616 the claim information to the host server. The host server submits 618 the prescription claim information to a plurality of discount network processor entities (620, 622, and 624). The discount network processors send 626 price and other information back to the host server. In some embodiments, the host server uses an A.I. engine, to determine 628 if the claim should be routed. If the claim is routed, a processor is determined to receive the claim. The A.I. may also determine what price the consumer user should pay. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithms considered by the A.I. engine include using these large sets to choose the lowest drug cost possible for the member while maintaining drug price at specific level to meet required pharmacy network generic effective rate and brand effective rate guarantees. The algorithms are used to optimize pricing. In some embodiments, the host server determines 632 whether the claim should be routed to a new processor. For Example, this determination made based on criteria if host's winning price is lower than the original PBM price In the event the claim should not be routed to a new claim processor, the host server may send a request 630 to the clearinghouse to release the claim from the PBM to the pharmacy. Otherwise, the host server sends 634 information about the winning claim processor to the clearinghouse. In some embodiments, the clearinghouse sends 636 a reversal request to the original PBM to reverse the paid claim. The clearinghouse routes the claim to the winning discount network provider and receives an updated price for the prescription. The clearinghouse sends 638 updated claim response information to the pharmacy originating the claim request. The clearinghouse may also send the claim response information from the discount processor to the host server. The pharmacy receives 640 the updated claim information including the host server acquired discount pricing. In one embodiment, receipt of the instant discounted claim is displayed on an end terminal at the pharmacy. The member may be notified 642 by the pharmacy that claim is paid with a lower price that was adjudicated by the PBM 608.

Figure 6:
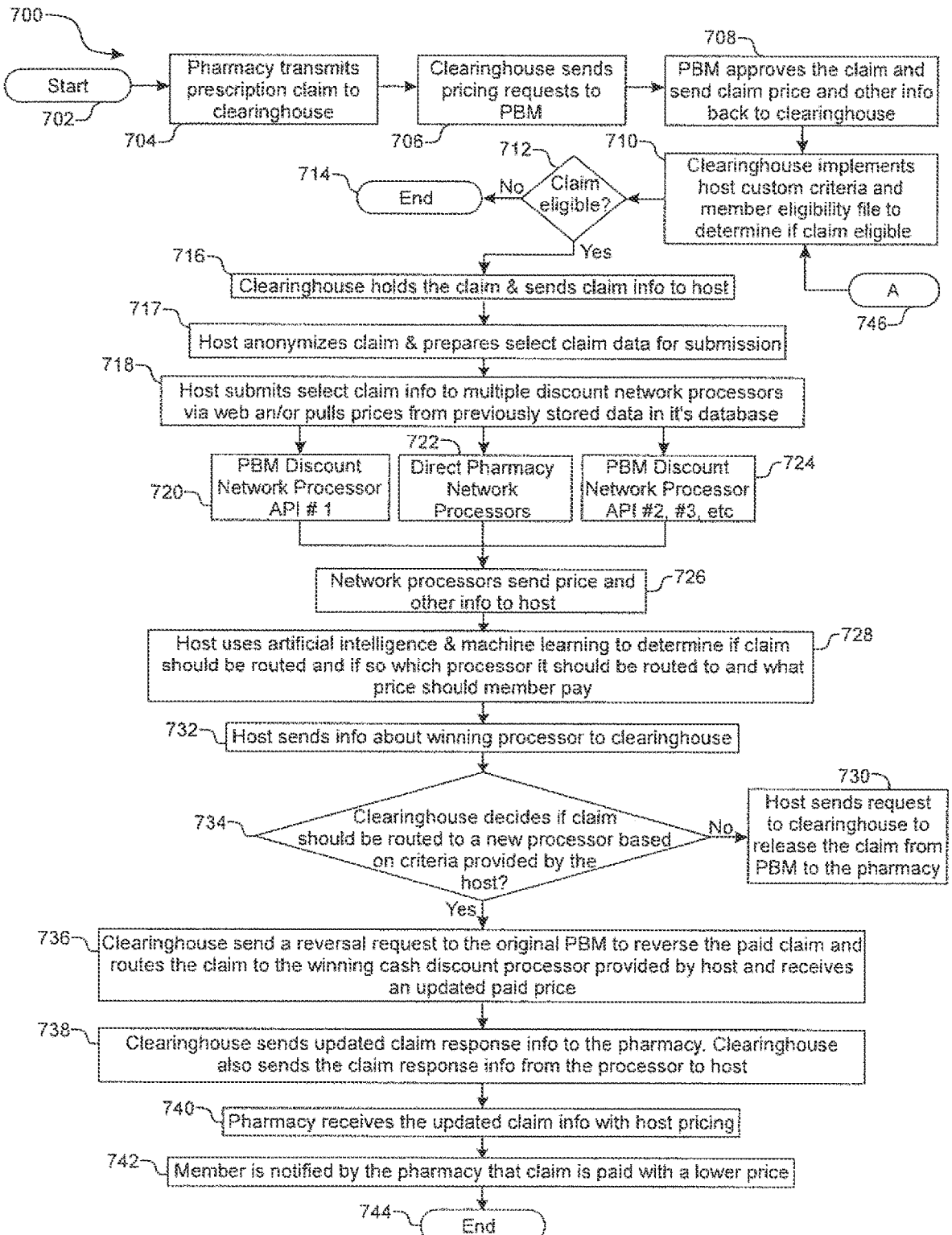
FIG. 6 is a flowchart of instantly generating a better drug price for a member than their PBM using a clearinghouse process to compare pricing post PBM adjudication according to another embodiment.

FIG. 6 shows a method 700 of instantly generating a better drug price for a member than their PBM using a clearinghouse process to compare pricing post PBM adjudication according to an embodiment. In the method 700, blocks 702-728 are similar to the actions in blocks 602-628 of method 500 and are not repeated for sake of eliminating unnecessary repetition. In method 700, after the host server uses 728 artificial intelligence to determining if a claim should be routed, etc., the host server may send 730 the winning discount network processor and other information about the proposed prescription fulfillment back to the clearinghouse. In some embodiments, the clearinghouse determines 734 whether the claim should be routed to a new processor based on criteria provided by the host server. If not, the host server may send a request 730 to the clearinghouse to release the claim from the PBM to the pharmacy. If so, the clearinghouse sends 736 a reversal request to the original PBM to reverse the paid claim. The clearinghouse may also send the claim response information from the discount processor to the host server. The clearinghouse may send 738 updated claim information to the pharmacy. The clearinghouse may also send the claim response information from the discount processor to the host server. The pharmacy receives 740 the updated claim information including the host server acquired discount pricing. In one embodiment, receipt of the instant discounted claim is displayed on an end terminal at the pharmacy. The member may be notified 742 by the pharmacy that claim is paid with a lower price that was adjudicated by the PBM 708.

Figure 7:
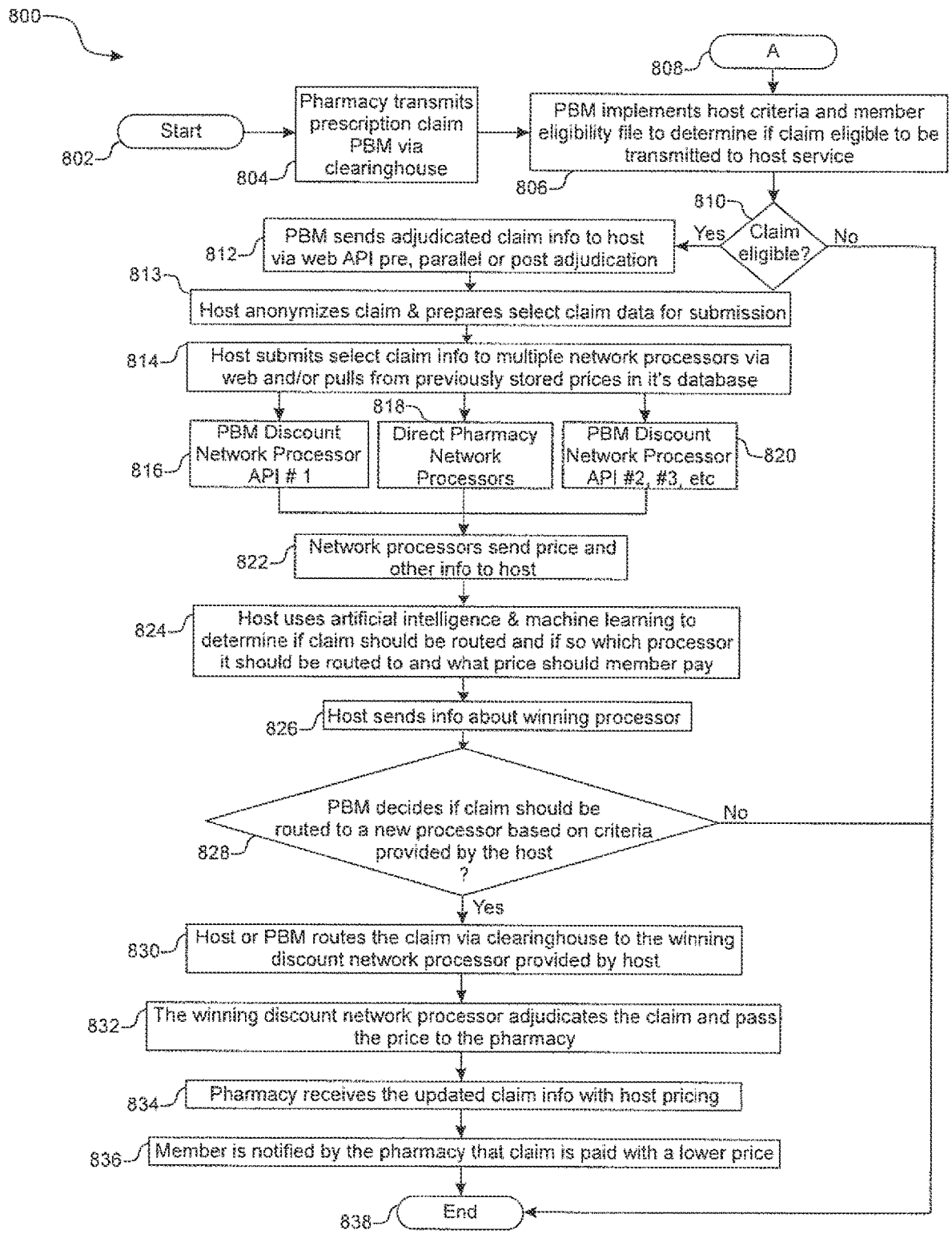
FIG. 7 is a flowchart of instantly generating a better drug price for a member than their PBM using a PBM process to compare pricing post PBM adjudication according to an embodiment.

FIG. 7 is a method 800 of instantly generating a better drug price for a member than their PBM using a PBM process to compare pricing post PBM adjudication according to an embodiment. After the initial starting block 802, the PBM receives 804 a prescription claim from a pharmacy via the clearinghouse. In some embodiments, the claim may have been initially rejected by a third-party entity. The PBM may implement custom criteria and the member eligibility file to determine 806 if the claim is eligible to be transmitted to the host server for processing under the instant method. Example criteria may include ID, BIN, PCN, Group, GPI, NDC, PBM, Reject code, PBM Message and others. The host server may determine 810 whether the claim is eligible for instant discount pricing which may be provided from other third-party entities that are not necessarily the entity that rejected the initial claim. If not, the method 800 may end at block 838. The PBM sends 812 adjudicated claim information to the host server. In some embodiments, the host server may anonymize 813 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim. The host server submits 814 the prescription claim information to a plurality of discount network processor entities (816, 818, 820). The discount network processors send 822 price and other information back to the host server. In some embodiments, the host server uses an A.I. engine, to determine 824 if the claim should be routed. If the claim is routed, a discount network processor is determined to receive the claim. The A.I. may also determine what price the consumer user should pay. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithm considered by the A.I. engine include using these large sets to choose the lowest drug cost possible for the member while maintaining drug price at specific level to meet required pharmacy network generic effective rate and brand effective rate guarantees. The algorithms are used to optimize pricing. The host server may send 826 the winning discount network processor and other information about the proposed prescription fulfillment to the PBM. In some embodiments, the PBM determines 828 whether the claim should be routed to a new discount network processor based on criteria provided by the host server. The host server or PBM routes 830 the claim via the clearinghouse to the discount network processor selected by the host server. The selected discount network processor adjudicates 832 the claim and passes the associated discounted price to the pharmacy. The pharmacy receives 834 the updated claim information including the host server acquired discount pricing. In one embodiment, receipt of the instant discounted claim is displayed on an end terminal at the pharmacy. The member may be notified 836 by the pharmacy that claim is paid with a lower price than was adjudicated by PBM.

Figure 8:
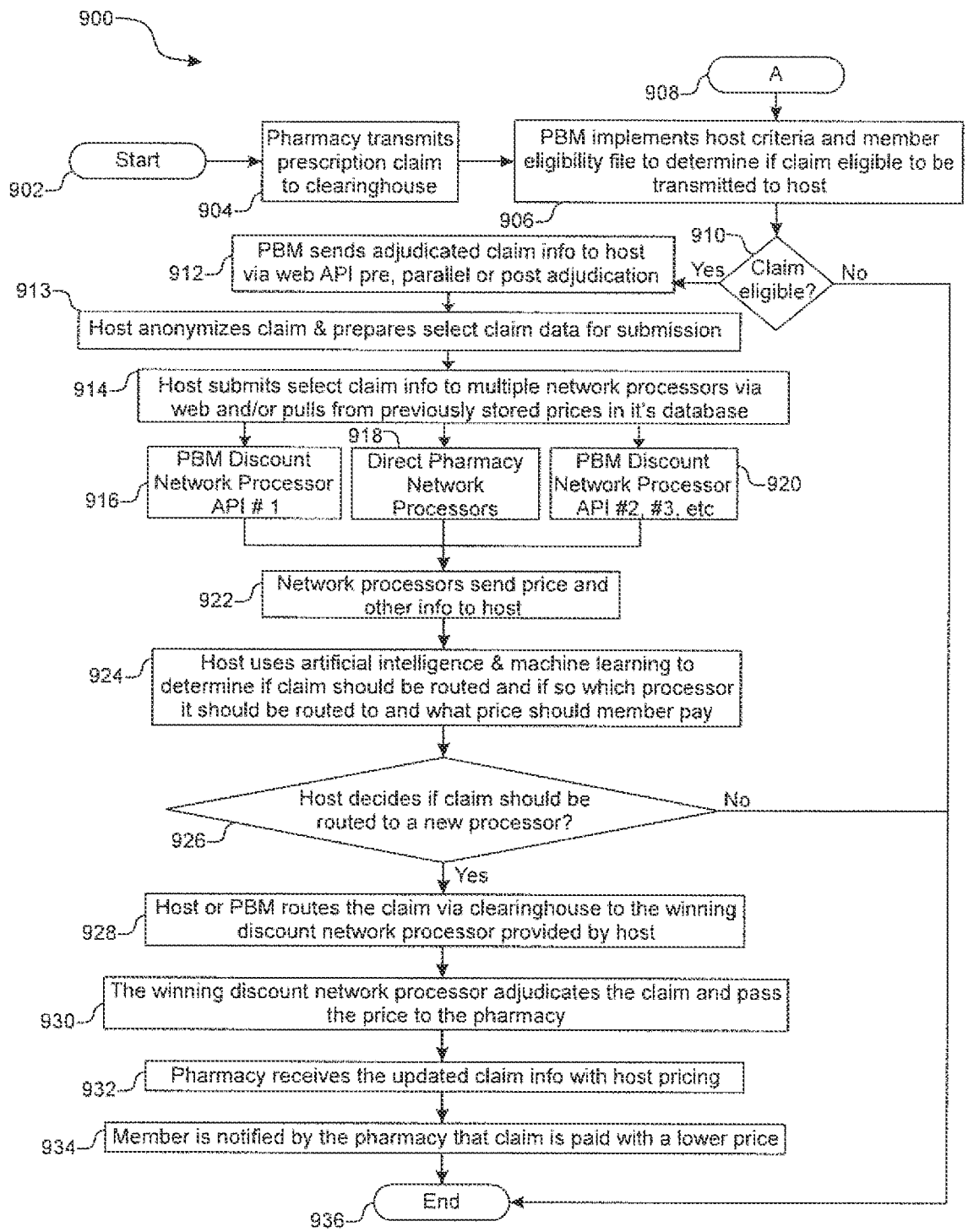
FIG. 8 is a flowchart of instantly generating a better drug price for a member than their PBM using a PBM process for Host to compare pricing post PBM adjudication according to another embodiment.

FIG. 8 shows a method 900 of instantly generating a better drug price for a member than their PBM using a PBM process for Host to compare pricing post PBM adjudication according to an embodiment. After start block 902, the pharmacy transmits 904 a prescription claim to the clearinghouse. In some embodiments, the claim may have been initially rejected by a third-party entity. Blocks 906-924 are similar to blocks 806-824 of method 800 and are not repeated for sake of eliminating unnecessary repetition. In method 900, after the host server uses 924 artificial intelligence to determine if a claim should be routed, etc., the host server may determine 926 whether the claim should be routed to a new discount network processor (using for example, any of the criteria inputted previously along with the claim). The host server or PBM routes 928 the claim via the clearinghouse to the discount network processor selected by the host server. The selected discount network processor adjudicates 930 the claim and passes the associated discounted price to the pharmacy. The pharmacy receives 932 the updated claim information including the host server acquired discount pricing. In one embodiment, receipt of the instant discounted claim is displayed on an end terminal at the pharmacy. The member may be notified 934 by the pharmacy that claim is paid with a lower price than was adjudicated by the PBM.

Figure 9:
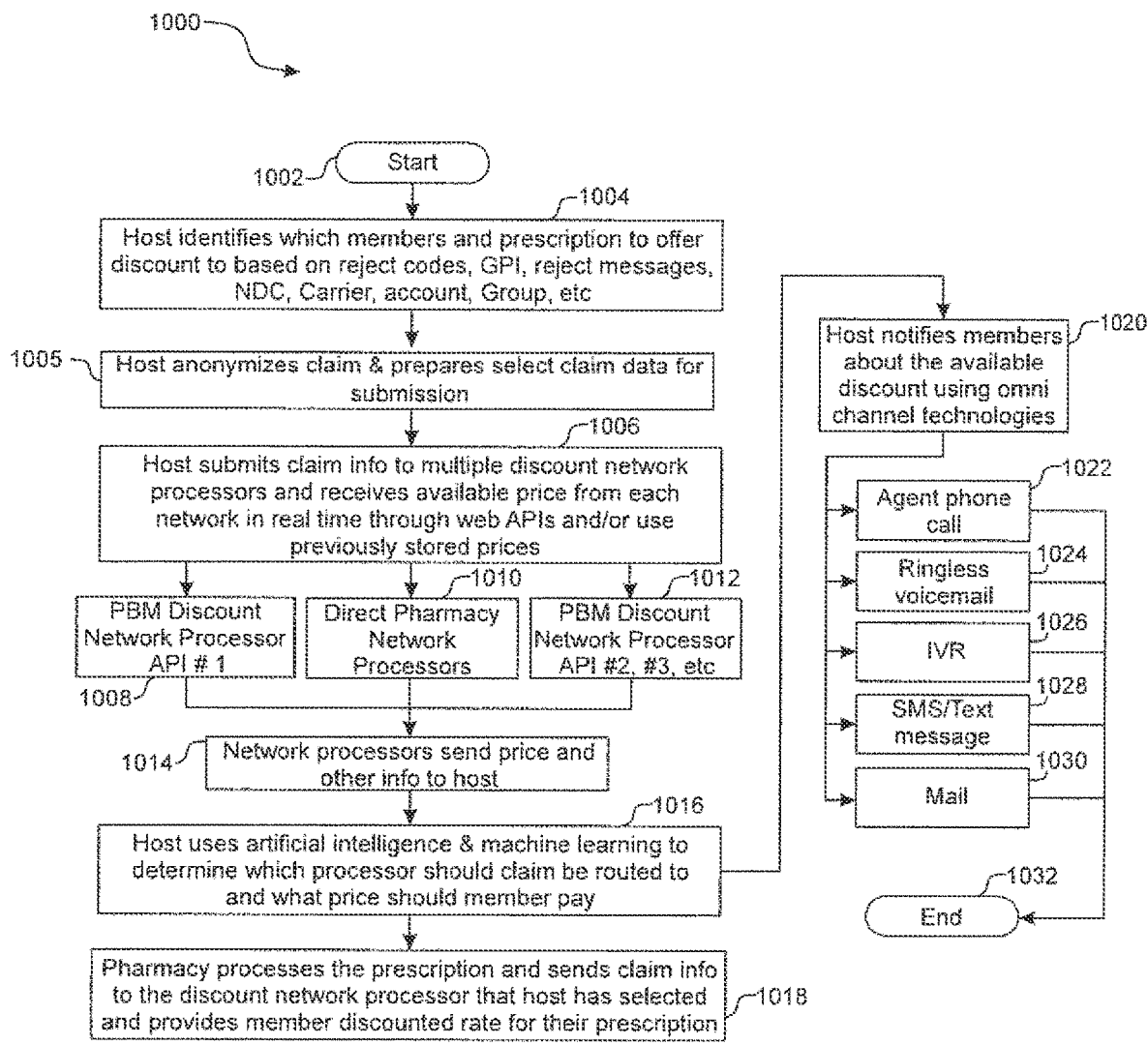
FIG. 9 is a flowchart of a process generating prescription discounts for rejected prescription claims retrospectively and notifying members according to an embodiment.

FIG. 9 shows a method 1000 of a process generating prescription discounts for rejected prescription claims retrospectively and notifying members according to an embodiment. After the start block 1002, the host server identifies 1004 members in a stored database that may qualify for discounted pricing on prescriptions after a prescription has bend adjudicated by a PBM. Qualification may be based on previous claims having received rejection codes, GPI, rejection messages, NDC, associated carrier for the member, account, group, etc. In some embodiments, the host server may anonymize 1005 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim. The host server submits 1006 the prescription claim information to a plurality of discount network processor entities (1008, 1010, 1012). The discount network processors send 1014 price and other information back to the host server. In some embodiments, the host server operates 1016 an A.I. engine, to select a best discount network processor to fulfill the prescription at a discount and an optimized price for a member to pay for the prescription. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithm considered by the A.I. engine include using these large sets to choose the lowest drug cost possible for the member while maintaining drug price at specific level to meet required pharmacy network generic effective rate and brand effective rate guarantees. The algorithms are used to optimize pricing. The host server sends 1018 the pharmacy terminal a selected discount network processor to fulfill the prescription at the determined price. In some embodiments, in response to the host server identifying the selected discount network processor and price for the prescription, the host server may automatically identify other members in the database and broadcast 1020 a message to identified members notifying them of the availability of the prescription at a discounted price. In some embodiments, the members identified may be based on previous or current use of the subject prescription. Avenues of broadcast may include for example, telephone call 1022, ringless voicemail 1024, use of interactive voice response systems 1026, short messaging systems/text messaging 1028, and mail (hard copy or electronic) 1030.

Figure 10:
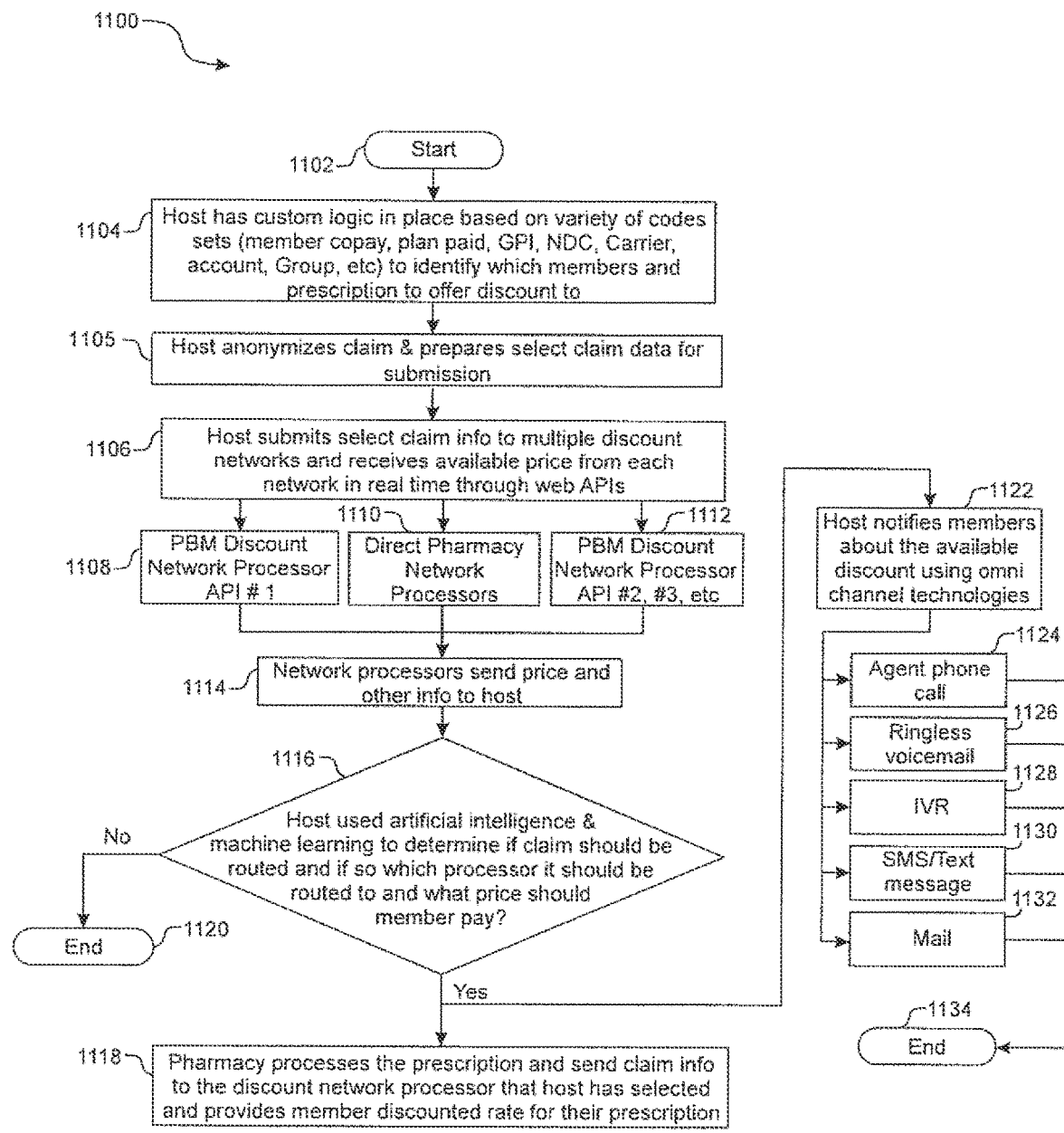
FIG. 10 is a flowchart of generating a better drug price for a member than their PBM retrospectively and notifying members according to an embodiment.

FIG. 10 shows a method 1100 of generating a better drug price for a member than their PBM retrospectively and notifying members according to an embodiment. After start block 1102, the host server identifies 1104 members in a stored database that may qualify for discounted pricing on prescriptions. Qualification may be based on member files that match criteria including for example, member co-pay, plan paid, generic product identifier (GPI), national drug code (NDC), carrier, account, group, etc. In some embodiments, the host server may anonymize 1105 the data in the claim (for example, removes the name, gender, race/ethnicity, and/or age of the claimant). The host server may use optical character recognition or tags that identify fields in the original electronic form of the claim and may wipe those fields from use in a new or placeholder claim form before the anonymized claim is sent off to third party processors to determine an optimal price for the claim. The host server submits 1106 the prescription claim information to a plurality of discount network processor entities (1108, 1110, 1112). The submission may include custom criteria input for one or more members seeking prescriptions. The custom criteria may include any combination of the criteria input. The discount network processors send 1114 price and other information back to the host server. In some embodiments, the host server operates 1116 an A.I. engine, to select a best discount network processor to fulfill the prescription at a discount and an optimized price for a member to pay for the prescription. Host's A.I. operates by processing data through advanced algorithms. It combs large data sets with its algorithms, learning from the patterns and features in the data. Examples of data sets considered by the A.I. engine include drug ingredient cost from PBM, discount network processors, direct network processors, dispensing fees, administrative fees, Drug NDC, Quantity, Day Supply, GPI, MONY code, the pharmacy chain code, the pharmacy NPI, the pharmacy NABP, retail/mail order indicators, compound code, OTC/Rx Code, client codes, generic/brand indicators, claim status, reject codes, reject messages. among many other data sets. Examples of criteria and algorithm considered by the A.I. engine include using these large sets to choose the lowest drug cost possible for the member while maintaining drug price at specific level to meet required pharmacy network generic effective rate and brand effective rate guarantees. The algorithms are used to optimize pricing. If a claim cannot be routed to a provider that can offer a discount, the method 1100 may terminate at block 1120. Otherwise, on successfully identification of a discount processor, the host server sends 1118 the pharmacy terminal a selected discount network processor to fulfill the prescription at the determined price. In some embodiments, in response to the host server identifying the selected discount network processor and price for the prescription, the host server may automatically identify other members in the database and broadcast 1120 a message to identified members notifying them of the availability of the prescription at a discounted price. In some embodiments, the members identified may be based on previous or current use of the subject prescription. Avenues of broadcast may include for example, telephone call 1122, ringless voicemail 1124, use of interactive voice response systems 1126, short messaging systems/text messaging 1128, and mail (hard copy or electronic) 1130.

Table 1 below shows simulated data representing the effect of the subject technology on prescription claims in an electronic network. As may be appreciated, it can be seen that substantial savings was incurred by the different user types when their claim was processed through the subject methods described above.

TABLE 1

|  | Claims Processed without Host Server | Claims Processed with Host Server |
|---|---|---|
| Total Drug Amount Paid by Member | $549,901 | $458,404 |
| Total Drug Amount Paid by Employer Groups | $1,770,045 | $1,600,987 |
| Total Drug Amount Paid to Pharmacy (Employer + Member) | $2,319,946 | $2,059,391 |

Table 2 shows the total savings for users of the subject technology.

TABLE 2

|  | Total Savings ($) | Total Savings (%) |
|---|---|---|
| Total Drug Amount Paid by Member | $91,497 | 17% |
| Total Drug Amount Paid by Employer Groups | $169,058 | 10% |
| Total Drug Amount Paid to Pharmacy (Employer + Member) | $260,555 | 11% |

Table 3 below shows a summary of the improved performance the subject technology has over conventional prescription claim processing systems. As can be seen, 31% of claims for individuals and 55% of claims through employers saved money using the subject technology, which is a substantial number over the current systems. Moreover, both individuals and employer entities benefited from the subject technology.

TABLE 3

| Summary from Claim Analysis Using Host server | |
|---|---|
| Total Claim Count | 53,412 |
| Claim Count Member Saves with Host server | 16,760 |
| Percentage of Claims Host server Saves Money for Member | 31% |
| Average Member Savings per Claim | $5.40 |
| Average Member Savings Percentage per Claim | 31% |
| Claim Count Employer Saves with Host server | 9,177 |
| Percentage of Claims Host server Saves money for Employer | 55% |
| Average Employer Savings per Claim | $18.42 |

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An automated method of generating optimized prescription pricing acquisition, comprising:
   receiving by a computer processor, an electronic request through a network connection from an end electronic pharmacy terminal, wherein:
   the electronic request includes a claim for a prescription of a drug associated with a claimant, and
   the electronic request includes a plurality of custom criteria associated with the prescription;

forwarding the electronic request to a plurality of third-party prescription providers, wherein the third-party prescription providers include at least one of an insurer, a clearinghouse, a discount network, or a pharmacy benefit manager;

receiving, in reply to the forwarded electronic request, proposed prices for the prescription and a proposed fulfillment of the prescription including three or more of the plurality of custom criteria, from respective third-party prescription providers;

forwarding, by the computer processor, the received proposed prices for the prescription and proposed fulfillments, to an artificial intelligence engine;

determining, by the artificial intelligence engine, a selected one of the third-party prescription providers, wherein the selection is based on identifying one of the third-party prescription providers that provides the proposed prescription fulfillment based on optimizing a combination of pricing and satisfying the plurality of custom criteria associated with the claimant's prescription;

routing the determined selected one of the third-party prescription providers and the proposed price along with satisfied custom criteria for the prescription, from the selected one of the third-party prescription providers, to the end electronic pharmacy terminal; and displaying the proposed price along with satisfied custom criteria for the prescription on the end electronic pharmacy terminal.

2. The method of claim 1, further comprising, prior to forwarding the electronic request to the plurality of third-party prescription providers, determining by the A.I. engine, a suggested price for the prescription.

3. The method of claim 1, further comprising:
receiving, by the computer processor, claimant identification fields in the claim, wherein the claimant identification fields include one or more of a name, a gender, a race or ethnicity, and an age; and
removing the claimant identification fields from the claim prior to forwarding the electronic request to the plurality of third-party prescription providers.

4. The method of claim 1, further comprising:
receiving by the computer processor, a default price for the prescription; and
negotiating by the computer processor, a discounted price for the prescription, wherein the proposed price from the selected one of the third-party prescription providers is the discounted price.

5. The method of claim 1, further comprising:
receiving, by the computer processor, a rejection of the claim from an initial third-party entity; and
in response to receiving the rejection of the claim, forwarding the electronic request to the plurality of third-party prescription providers, but not including the initial third-party entity.

6. The method of claim 1, further comprising:
automatically identifying by the computer processor, other claimants in a database; and
broadcasting, by the computer processor, a message to identified other claimants in response to receiving the proposed price for the prescription, notifying the identified other claimants of an availability of the prescription at a discounted price.

7. The method of claim 6, wherein the identified other claimants are based on current or previous use of a drug associated with the prescription.

8. A non-transitory computer program product for automated generation of optimized prescription pricing acquisition, the non-transitory computer program product comprising:
one or more non-transitory computer readable storage media, and program instructions collectively stored on the one or more non-transitory computer readable storage media, the program instructions comprising:
receiving by a computer processor, an electronic request through a network connection from an end electronic pharmacy terminal, wherein:
the electronic request includes a claim for a prescription associated with a claimant, and
the electronic request includes a plurality of custom criteria associated with the prescription;
forwarding the electronic request to a plurality of third-party prescription providers, wherein the third-party prescription providers include at least one of an insurer, a clearinghouse, a discount network, or a pharmacy benefit manager;
receiving, in reply to the forwarded electronic request, proposed prices for the prescription and a proposed fulfillment of the prescription, from respective third-party prescription providers including three or more of the plurality of custom criteria;
determining, by the computer processor, a selected one of the third-party prescription providers, wherein the selection is based on identifying one of the third-party prescription providers that provides the proposed prescription fulfillment based on optimizing a combination of pricing and satisfying the plurality of custom criteria associated with the claimant's prescription;
routing the determined selected one of the third-party prescription providers and the proposed price along with satisfied custom criteria for the prescription, from the selected one of the third-party prescription providers, to the end electronic pharmacy terminal; and
displaying the proposed price along with satisfied custom criteria for the prescription on the end electronic pharmacy terminal.

9. The computer program product of claim 8, wherein the program instructions further comprise, prior to forwarding the electronic request to the plurality of third-party prescription providers, a suggested price for the prescription.

10. The computer program product of claim 8, wherein the program instructions further comprise:
receiving, by the computer processor, claimant identification fields in the claim, wherein the claimant identification fields include one or more of a name, a gender, a race or ethnicity, and an age; and
removing the claimant identification fields from the claim prior to forwarding the electronic request to the plurality of third-party prescription providers.

11. The computer program product of claim 8, wherein the program instructions further comprise:
receiving, by the computer processor, a default price for the prescription; and
negotiating by the computer processor, a discounted price for the prescription, wherein the proposed price from the selected one of the third-party prescription providers is the discounted price.

12. The computer program product of claim 8, wherein the program instructions further comprise:
receiving, by the computer processor, a rejection of the claim from an initial third-party entity; and in response to receiving the rejection of the claim, determining whether the claim is eligible for discount pricing prior to forwarding the electronic request to the plurality of third-party prescription providers, but not including the initial third-party entity.

13. The computer program product of claim 8, wherein the program instructions further comprise:
   automatically identifying by the computer processor, other claimants in a database; and
   broadcasting, by the computer processor, a message to identified other claimants in response to receiving the proposed price for the prescription, notifying the identified other claimants of an availability of the prescription at a discounted price.

14. The computer program product of claim 13, wherein the identified other claimants are based on current or previous use of a drug associated with the prescription.

15. A computer server for automated generation of optimized prescription pricing acquisition, comprising:
   a network connection;
   one or more computer readable storage media;
   a computer processor coupled to the network connection and coupled to the one or more computer readable storage media; and
   a computer program product comprising program instructions collectively stored on the one or more computer readable storage media, the program instructions comprising:
   receiving by the computer processor, an electronic request through the network connection from an end electronic pharmacy terminal, wherein:
   the electronic request includes a claim for a prescription of a drug associated with a claimant, and
   the electronic request includes a plurality of custom criteria associated with the prescription;
   forwarding the electronic request to a plurality of third-party prescription providers, wherein the third-party prescription providers include at least one of an insurer, a clearinghouse, a discount network, or a pharmacy benefit manager;
receiving, in reply to the forwarded electronic request, proposed prices for the prescription and a proposed fulfillment of the prescription including three or more of the plurality of custom criteria, from respective third-party prescription providers;
   determining, by the artificial intelligence engine, a selected one of the third-party prescription providers, wherein the selection is based on identifying one of the third-party prescription providers that provides the proposed prescription fulfillment based on optimizing a combination of pricing and satisfying the plurality of custom criteria associated with the claimant's prescription;
   routing the determined selected one of the third-party prescription providers and the proposed price along with satisfied custom criteria for the prescription, from the selected one of the third-party prescription providers, to the end electronic pharmacy terminal; and
   displaying the proposed price along with satisfied custom criteria for the prescription on the end electronic pharmacy terminal.

16. The computer server of claim 15, wherein the program instructions further comprise, prior to forwarding the electronic request to the plurality of third-party prescription providers, determining a suggested price for the prescription.

17. The computer server of claim 15, wherein the program instructions further comprise:
   receiving, by the computer processor, claimant identification fields in the claim, wherein the claimant identification fields include one or more of a name, a gender, a race or ethnicity, and an age; and
   removing the claimant identification fields from the claim prior to forwarding the electronic request to the plurality of third-party prescription providers.

18. The computer server of claim 15, wherein the program instructions further comprise:
   receiving, by the computer processor, a default price for the prescription; and
   negotiating by the computer processor, a discounted price for the prescription, wherein the proposed price from the selected one of the third-party prescription providers is the discounted price.

19. The computer server of claim 15, wherein the program instructions further comprise:
   receiving, by the computer processor, a rejection of the claim from an initial third-party entity; and
   in response to receiving the rejection of the claim, determining whether the claim is eligible for discount pricing prior to forwarding the electronic request to the plurality of third-party prescription providers, but not including the initial third-party entity.

20. The computer server of claim 15, wherein the program instructions further comprise:
   automatically identifying by the computer processor, other claimants in a database; and
   broadcasting, by the computer processor, a message to identified other claimants in response to receiving the proposed price for the prescription, notifying the identified other claimants of an availability of the prescription at a discounted price.

* * * * *